(No Model.) 2 Sheets—Sheet 1.

T. BOLIG.
MITER BOX.

No. 577,227. Patented Feb. 16, 1897.

WITNESSES
Carl H. Keller.
Maud Schumacher.

INVENTOR
Thomas Bolig
By William Webster Atty.

(No Model.) 2 Sheets—Sheet 2.
T. BOLIG.
MITER BOX.
No. 577,227. Patented Feb. 16, 1897.
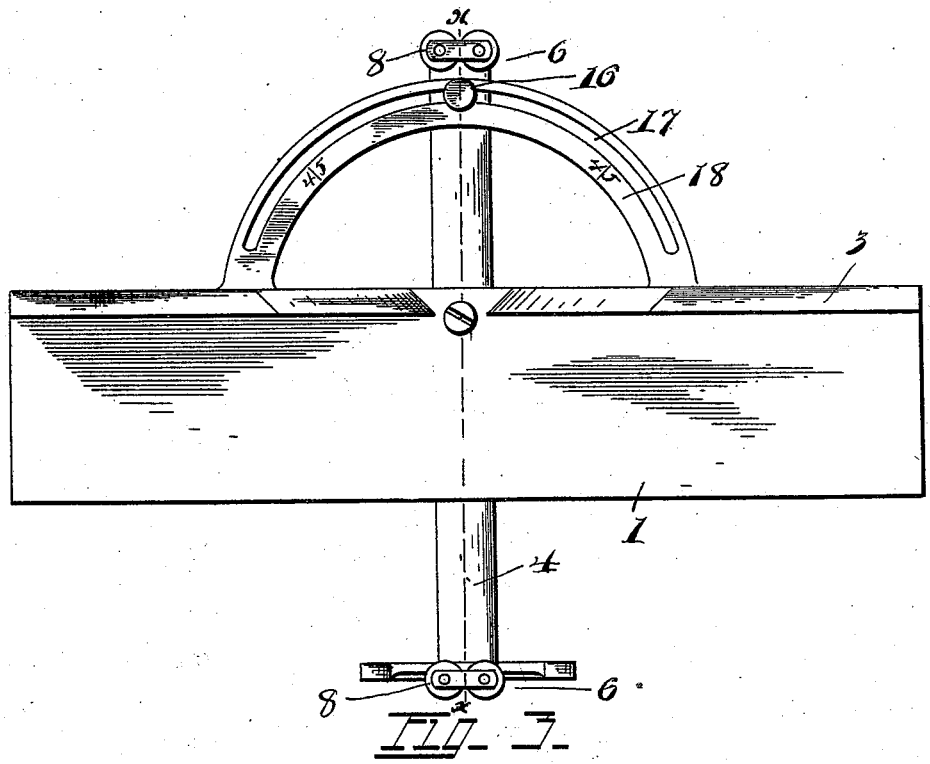
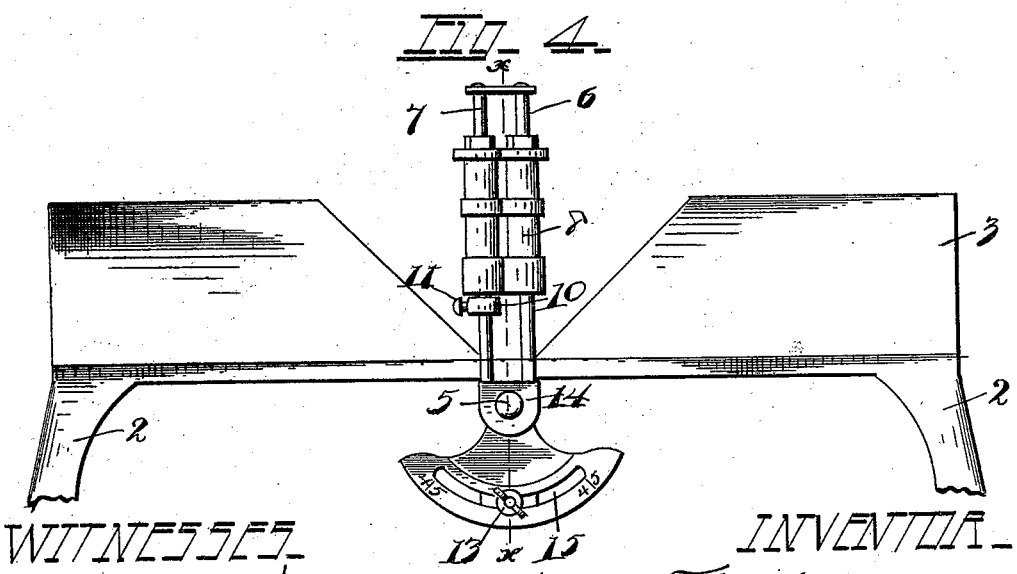
WITNESSES
Earl N. Keller.
Maud Schumacher
INVENTOR
Thomas Bolig
By William Webster
Atty.

UNITED STATES PATENT OFFICE.

THOMAS BOLIG, OF BELLEVUE, OHIO.

MITER-BOX.

SPECIFICATION forming part of Letters Patent No. 577,227, dated February 16, 1897.

Application filed September 5, 1896. Serial No. 604,934. (No model.)

*To all whom it may concern:*

Be it known that I, THOMAS BOLIG, of Bellevue, county of Huron, and State of Ohio, have invented certain new and useful Improvements in Miter-Boxes; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a miter-box, and has for its object to provide an accurate adjustable gage by which to guide the saw in cutting to a miter of any degree, with an adjustability to a horizontal plane and also in a vertical plane, whereby a miter may be cut to any degree radially and also to any desired inclination vertically, that is to say, to a miter of forty-five degrees or less radially and also to a vertical inclination of forty-five degrees or less, thereby joining two sections upon an inclined level.

A further object is to provide a miter-box of accurate adjustability, of inexpensive construction and convenience of adjustment.

Figure 1:
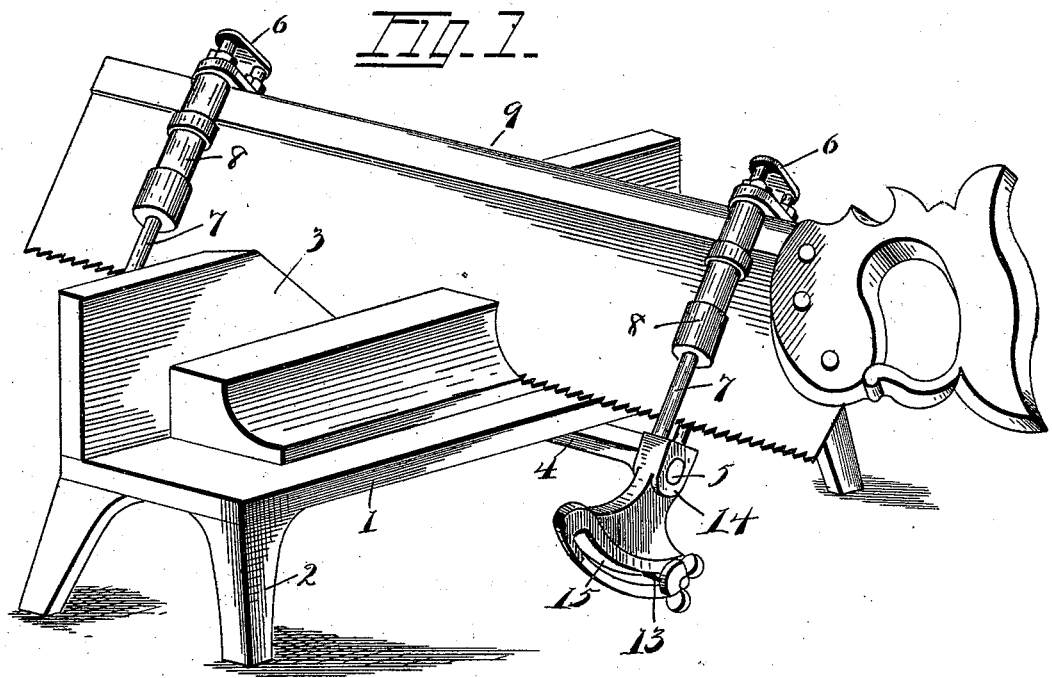
Figure 2:
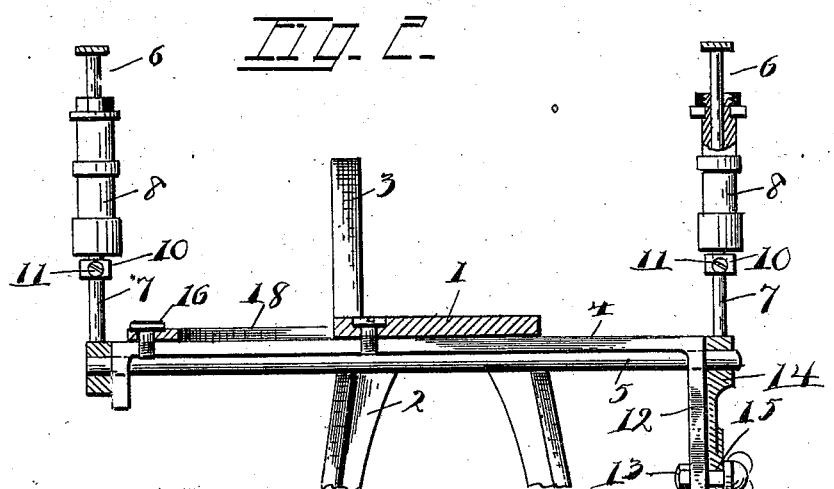

In the drawings, Figure 1 is an elevation of a miter-box constructed in accordance with my invention, showing the saw-guide in a vertical adjustment. Fig. 2 is a transverse vertical section on lines $x\,x$, Figs. 3 and 4. Fig. 3 is a top plan view, and Fig. 4 is a front elevation.

Heretofore in the construction of miter-boxes there has been the objection, first, of a multiplicity of parts involving not only great expense, but skill in adjusting, and, second, a liability of movement from adjustment, and consequently an imperfect joint, and in none of the devices of this character is there provision for cutting upon two angles. I regard the feature of cutting upon an inclined level of great importance in addition to the novel features of construction independent thereof.

1 designates the bed, suitably supported upon legs 2 and having a right-angled back plate 3, recessed to an angle of ninety degrees and mitered to an angle of forty-five degrees. Pivotally secured upon the under side of the bed 1 is a bar 4, having a radial movement in a horizontal plane, and journaled in the bar is a shaft or rod 5, having a revoluble movement with relation to the bar 4. Secured upon the shaft 5 are saw-guides 6, comprising vertical standards 7, upon which are journaled rollers 8, between which the saw 9 reciprocates, there being an adjustable stop 10 movable upon one of the standards 7, adjustable by means of a set-screw 11 to limit the saw in its downward cut. Depending from the bar 4 is a plate 12, having a set-screw 13 screwed therein. Standards are secured in a plate 14, having a slot 15 curved in the arc of a circle, through which set-screw 13 passes, whereby the saw-guide, when turned to any desired angle, may be secured firmly in place. Plate 14 is preferably arranged with a scale extending oppositely from the center from "0°" to "45°." So far the manipulation of the saw-guides has been described as pertaining to the possibility of cutting upon a vertical incline. In order to cut a miter upon a horizontal plane, bar 4 is revolved upon its pivot to any degree desired, and is preferably held at one outer end by means of a set-screw 16, traveling in a curved slot 17 of a scale-plate 18, having scale-marks from "0°" to "45°" extending in either direction from the center, whereby a miter of any desired angle may be cut by the adjustment of the bar.

In operation the material to be cut is placed upon the bed-plate and pressed securely against the plate 3, when the bar 4 is secured at any angle to cut the desired miter, when the set-screw 16 is turned to secure the bar firmly in place, and if it is desired to cut upon two angles set-screw 15 is loosened and the saw-guide rocked with shaft 5 to the desired vertical angle, when the set-screw is firmly secured to place. The saw is now inserted in the guides and stops 10 are set upon the standards 7 to allow the proper depth of cut.

It will be seen that the device is composed of few parts, that the adjustment is convenient to the operator, and that in addition to cutting the ordinary miter it enables the operator to cut upon angles in opposition and to any desired degree.

What I claim is—

In a miter-box, a horizontal adjustable radial bar pivotally mounted to a bed-plate and carrying, parallel to itself in journals supported from both ends, a bar radially adjustable mounted with saw-guides and vertically-adjustable saw-rollers to gage the depth of cut vertically, a sectant with a set-screw mounted upon the face to the bar carrying the standards for radial adjustment.

In testimony that I claim the foregoing as my own I hereby affix my signature in presence of two witnesses.

THOMAS BOLIG.

Witnesses:
WILLIAM WEBSTER,
CARL H. KELLER.